United States Patent
Koll et al.

(10) Patent No.: US 7,483,184 B2
(45) Date of Patent: Jan. 27, 2009

(54) METHOD AND SYSTEM FOR USING AN OPTICAL SENSOR ARRAY TO CONTROL A LABELING DEVICE

(75) Inventors: Andrew Koll, Albany, OR (US); Daryl E. Anderson, Corvallis, OR (US); Andy Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1157 days.

(21) Appl. No.: 10/683,021

(22) Filed: Oct. 9, 2003

(65) Prior Publication Data

US 2005/0078324 A1    Apr. 14, 2005

(51) Int. Cl.
 *H04N 1/40* (2006.01)
 *H04N 1/04* (2006.01)
 *G11B 7/085* (2006.01)
(52) U.S. Cl. ............... 358/486; 358/462; 369/30.03
(58) Field of Classification Search .......... 358/474, 358/475, 296, 462, 486, 471, 443; 369/13.01, 369/13.24, 13.35, 30.03; 206/307; 264/1.33; 312/9.1; 382/317, 321
 See application file for complete search history.

(56) References Cited

U.S. PATENT DOCUMENTS

| | | | | |
|---|---|---|---|---|
| 5,161,141 A * | 11/1992 | Sawata | ............... | 369/44.25 |
| 5,317,337 A | 5/1994 | Ewaldt | | |
| 5,587,845 A * | 12/1996 | Goda | ............... | 359/819 |
| 5,927,208 A | 7/1999 | Hagstrom | | |
| 6,041,703 A | 3/2000 | Salisbury | | |
| 6,109,324 A | 8/2000 | Bugner et al. | | |
| 6,172,958 B1 | 1/2001 | Mochizuki | | |
| 6,384,929 B1 | 5/2002 | Miller | | |
| 6,385,257 B1 * | 5/2002 | Tobita et al. | ............... | 375/334 |
| 6,501,718 B1 | 12/2002 | Ono et al. | | |
| 2001/0005343 A1 * | 6/2001 | Shoji et al. | ............... | 369/47.51 |
| 2002/0046177 A1 | 4/2002 | Oshima et al. | | |
| 2002/0048241 A1 | 4/2002 | Kumagai et al. | | |
| 2002/0180959 A1 * | 12/2002 | Nakajima et al. | ............... | 356/237.1 |
| 2003/0107959 A1 | 6/2003 | Norton et al. | | |
| 2003/0108708 A1 | 6/2003 | Anderson et al. | | |

FOREIGN PATENT DOCUMENTS

| | | |
|---|---|---|
| CN | 1196816 A | 10/1998 |
| EP | 1308938 A | 7/1999 |
| EP | 1037020 A2 | 9/2000 |
| EP | 1143426 A | 10/2001 |
| JP | 2000040264 * | 2/2000 |
| JP | 2000-173238 A | 6/2000 |
| JP | 2002-324380 A | 11/2002 |
| JP | 2003141844 * | 5/2003 |
| WO | 99/50070 A | 10/1999 |

OTHER PUBLICATIONS

European Search Report; Application No. EP04256084, filed Oct. 1, 2004; report issued Aug. 10, 2007.

* cited by examiner

*Primary Examiner*—Jerome Grant, II (57) ABSTRACT

A method for using an optical sensor array to control a labeling device includes scanning a surface texture of an imageable media with the optical sensor array, collecting surface data corresponding to the surface texture of the imageable media, and controlling the labeling device in response to the surface data.

14 Claims, 10 Drawing Sheets

METHOD AND SYSTEM FOR USING AN OPTICAL SENSOR ARRAY TO CONTROL A LABELING DEVICE

BACKGROUND

Optical discs have fast become an industry standard for data storage in the fields of computers, video, and music. Optical discs include, but are not limited to, compact discs (CDs), Digital Video (or Versatile) Discs (DVDs), and game system discs in a variety of formats. Commercially produced optical discs usually have digital data recorded on one side of the disc and a visual display printed on the opposite side of the disc.

In some instances, optical discs are created that can store data on both sides of the disc. However, in most cases, it is desirable to limit the optical disc data to a single side of the disc, leaving the other side of the disc for printed text, patterns, or graphics. The printed labeling on a non-data side of an optical disc can include a decorative design, text identifying the data stored on the disc, or both.

As optical technology has advanced, writeable and rewritable optical discs as well as equipment for writing onto the discs have become reasonably priced and are now within the financial grasp of many consumers. Thus, many consumers currently have the ability to store data on an optical disc with home office computer equipment.

However, very specialized and expensive equipment is required to professionally label an optical disc. Consequently, the labeling of discs by most consumers is typically limited to either printing on separate adhesive labels that are subsequently adhered to the non-data side of the disc, handwriting with a marker directly on the disc, or handwriting on an adhesive label.

As label-printing technology has advanced, new methods for printing on imageable surfaces have emerged. Some optical disks allow for labels to be printed directly on the non-data side of the disc using the laser of an optical disc drive. This direct writing method, however, is limited by the resolution of the optical disc drive to track the position of the laser with respect to the non-data surface of the disc as well as the need for motor speed control.

SUMMARY

A method for using an optical sensor array to control a labeling device includes scanning a surface texture of an imageable media with the optical sensor array, collecting surface data corresponding to the surface texture of the imageable media, and controlling the labeling device in response to the surface data.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

The present specification describes a method and a system for controlling an optical disc drive based on information received from an optical sensor array. The optical sensor array may provide information including, but in no way limited to, the position of an optical disc drive moveable member, rotational speed of an optical disc, and/or information regarding previously printed disc information.

As used in this specification and in the appended claims, the term "optical disk" is meant to be understood as any data storage disk capable of containing optically readable information including, but in no way limited to, compact discs (CDs), Digital Video (or Versatile) Discs (DVDs), or game system discs in a variety of formats. Additionally, an angle of incidence is meant to be understood as an angle between an incident ray of light and the perpendicular to a surface. Moreover, the term "imageable medium" is meant to be understood as any material whose lucidity may be selectively varied with the application of photonic radiation.

In the following description, for purposes of explanation, numerous specific details are set forth in order to provide a thorough understanding of the present system and method for controlling an optical disc drive based on information received from an optical sensor array. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1A:
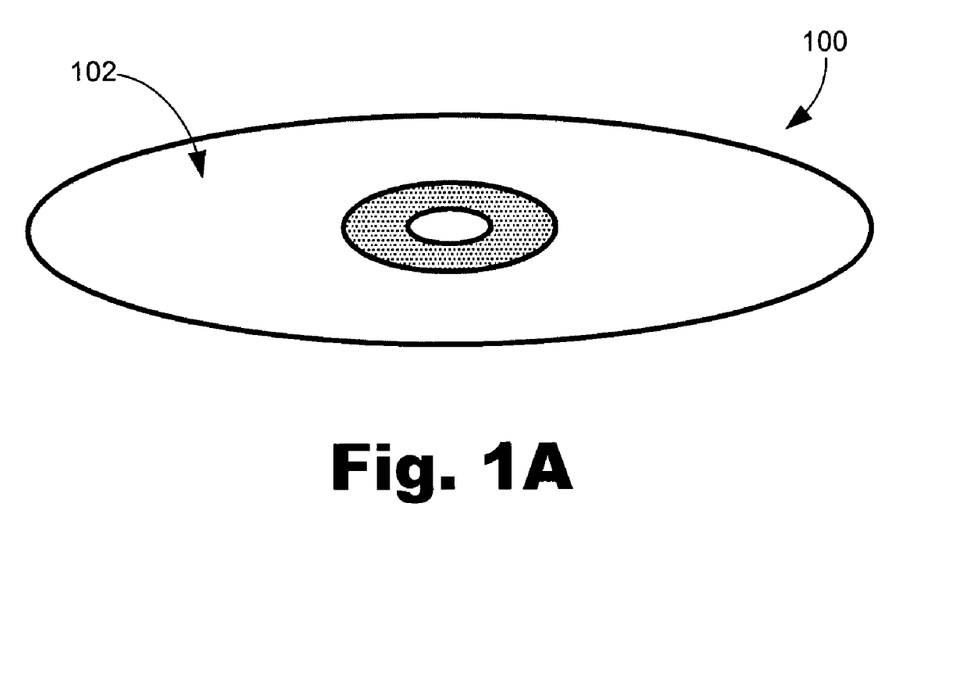
FIGS. 1A and 1B illustrate perspective views of an optical disc according to one exemplary embodiment.
Figure 1B:
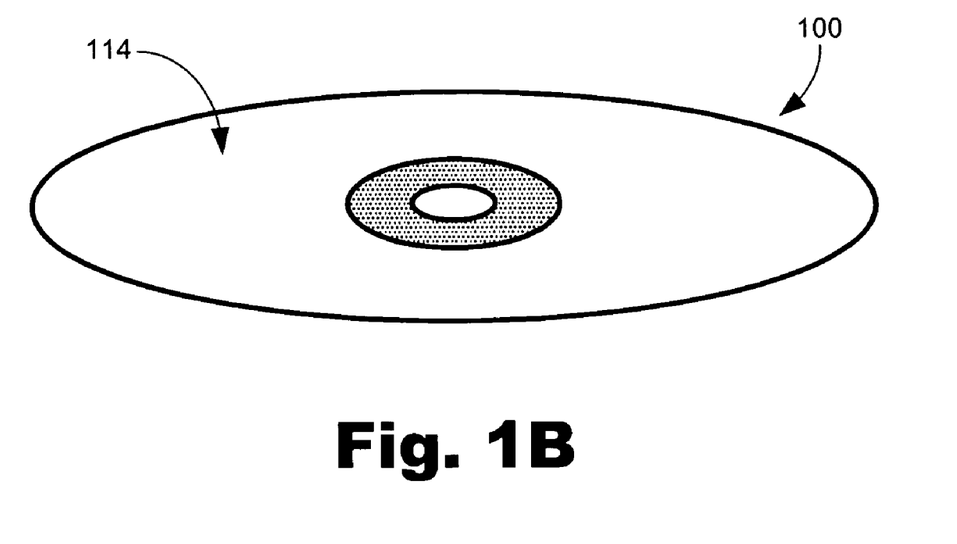

FIG. 1A and FIG. 1B illustrate perspective views of an optical disk according to one exemplary embodiment. As shown in FIG. 1A and FIG. 1B, an optical disc (100) is typically a round wafer of imageable medium with two planar surfaces. Traditionally, one planar surface of the disc is used for storing digital data (114; FIG. 1B) and the opposite side of the disc is used for some type of printed labeling (102; FIG. 1A). In some alternative embodiments, both sides of the optical disc (100) may be used for storing digital data. The printed labeling on the non-data side of the disc may include a decorative design, text identifying the data stored on the disc, or both. The printed labeling (102) may be affixed to the optical disc (100) in a variety of manners. For example, the label may be printed on a printing device and then affixed to the optical disc (100) with some type of adhesive. Alternatively, the label may be written directly onto the disc (100) using a photonic emitter of an optical disc drive.

As noted previously, a number of optical disks (100) include one or more surfaces whose optical characteristics may be modified by the selective application of a photonic emitter such as a laser from an optical disk drive. As the photonic emitter of an optical disk drive strikes the surface of the modifiable optical disks (100), the lucidity of the disk surface is modified. This change in lucidity may then be used to form patterns or labels on the surface of the disk (100). While this method of labeling disk surfaces is advantageous, traditional optical disk drives are unable to both detect previously formed labels or to identify various locations with respect to the optical disk.

Moreover, in some applications, it is desirable to operate an optical disc drive at a relatively low rotational speed. Under these circumstances, stepper and direct current (DC) motors are limited as to how precisely they can track the position of the sled. Typically, the data side of an optical disc is faintly marked with guides to aid an optical pickup unit (OPU) in determining its position. The non-data or label side of the optical disc is usually unmarked, thus causing a potential problem for those who wish to write a label on the unmarked non-data side of the disc due to an inability to track the position of the sled.

Figure 2:
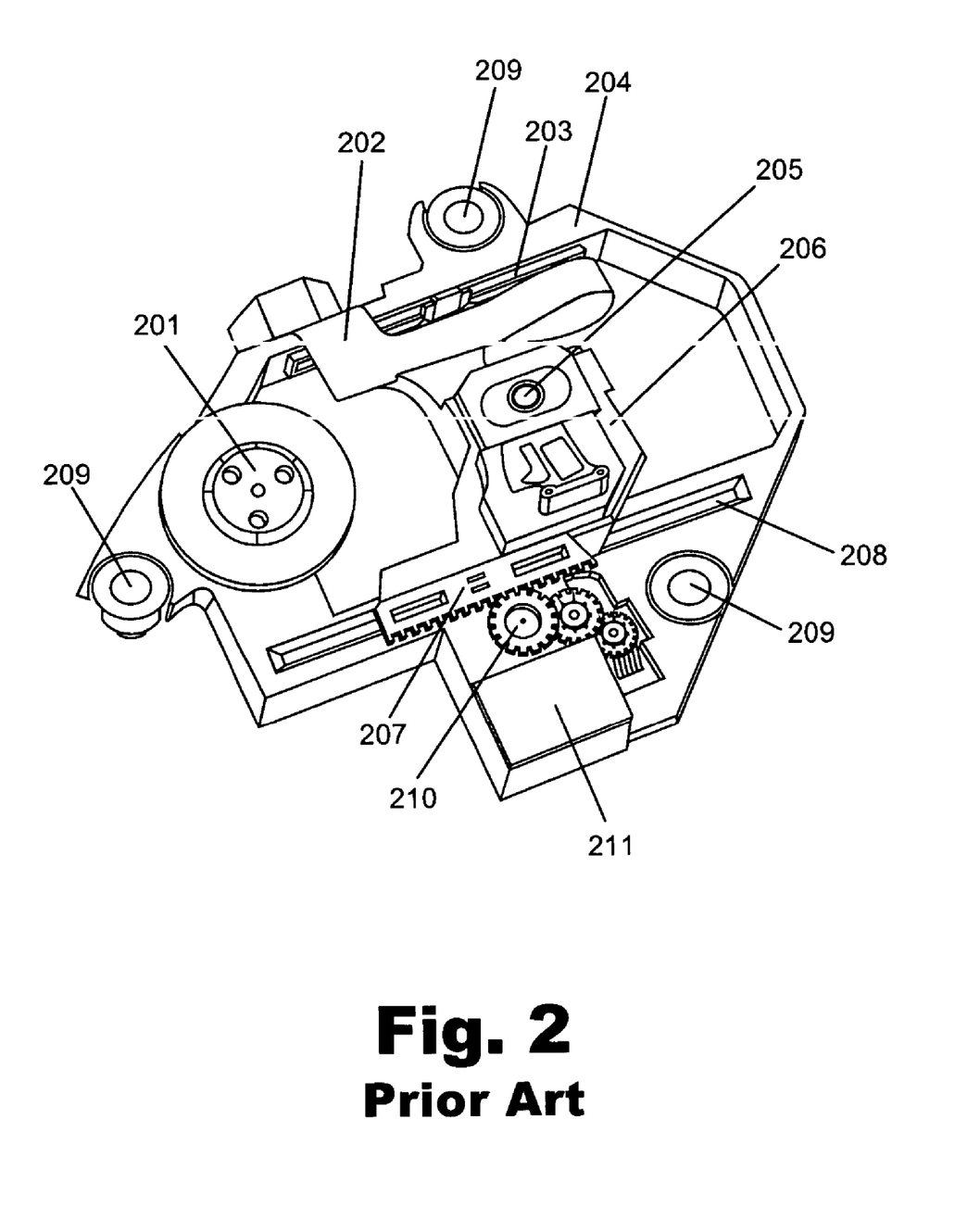
FIG. 2 is a block diagram of an optical disc drive according to one exemplary embodiment.

FIG. 2 illustrates some of the components of an optical disc drive (200) according to one exemplary embodiment. As will be familiar to one skilled in the art, an optical disc drive (200), such as the one illustrated in FIG. 2, is typically used to read data from an optical disc (100; FIG. 1A). Data may be read from an optical disk by first spinning the optical disc (100; FIG. 1A) on a spindle (201) controlled by a motor (not shown). While the optical disc (100) is spinning, laser light is focused onto the disc (100; FIG. 1A) using a lens (205) and, upon reflecting off the optical disc (100; FIG. 1A), the light is sensed using a photodetector. The laser, the laser driver, the lens, and the photodetector comprise an optical pickup unit (OPU). The OPU is disposed on a sled (206) which is actuated up or down a sled support rail (203) by a stepper or DC motor (not shown) which is covered by a motor housing (211) and coupled with a gearing system (210). As the sled and OPU move, the laser and photodetector are able to "read" the disc (100; FIG. 1A) by detecting bumps and grooves imprinted on the disc (100; FIG. 1A). The sled is held in place by a sled retainer (207) as the sled moves along the guide rail (208). The data read by the optical disc drive (200) may be transferred via a flex cable (202) to a communicatively coupled computing device (not shown). The entire assembly of the above-mentioned parts may be housed in an optical device drive chassis (204) and securely fastened using a number of mounts (209).

According to one exemplary embodiment of the present system and method, the OPU illustrated in FIG. 2 may also be coupled to an optical sensor configured to scan and provide information regarding the surface texture of any disk (100; FIG. 1A) being scanned. For example, the optical sensor may be affixed to a sled, on which the optical pickup unit (OPU) typically resides. When attached next to the OPU on the sled, the optical sensor travels with the sled The optical sensor is then capable of detecting where the sled is in reference to the optical disc. This process will be explained in greater detail below.

Figure 3A:
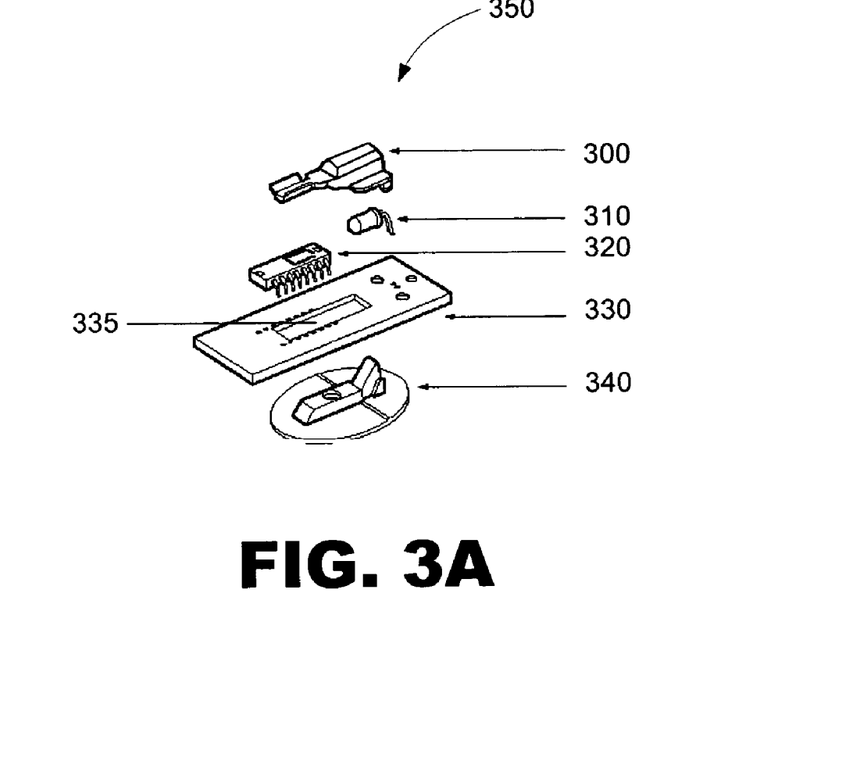
FIG. 3A is an exploded view of the components of an optical sensor array according to one exemplary embodiment.
Figure 3B:
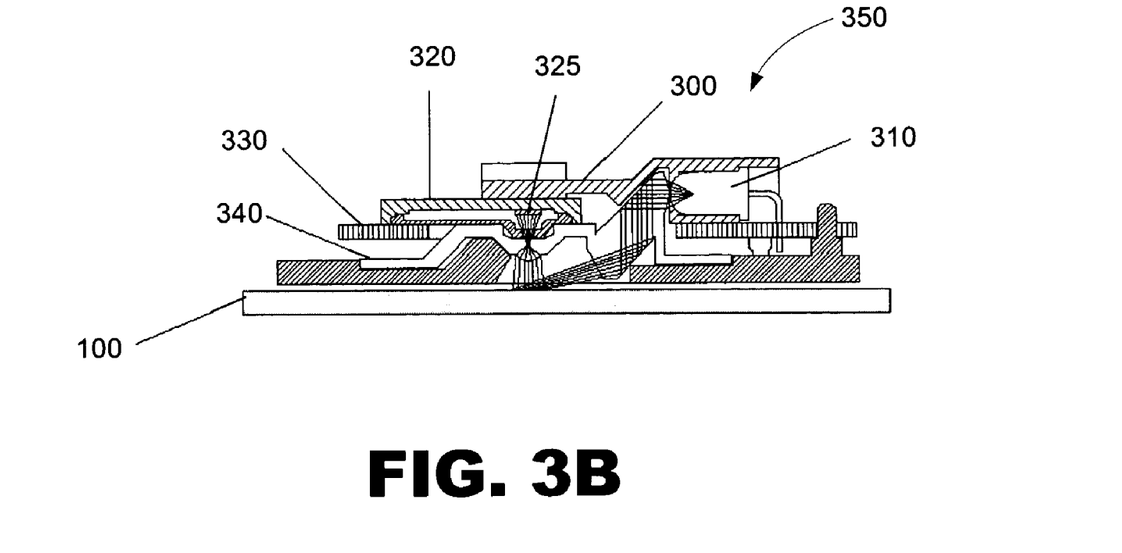
FIG. 3B is an assembled view of an optical sensor array according to one exemplary embodiment.

FIG. 3A is an exploded view illustrating the components of an exemplary optical sensor array (350) that may be coupled to the OPU as explained above. As shown in FIG. 3A, the exemplary optical sensor array (350) may include a positioning clip (300), an illuminator (310), a photo sensor (320) containing a photo sensor array (325; FIG. 3B), a printed circuit board (330) containing a center orifice (335), and a lens (340).

The illuminator (310) illustrated in FIG. 3A may be any light source, coherent or non-coherent, capable of illuminating a surface of a disk (100; FIG. 1A) such that the photodetector array (325; FIG. 3B) may sense changes in the surface texture. Changes in surface texture that may be illuminated by the present illuminator (310) and subsequently detected by the photodetector array (325; FIG. 3B) may include, but are in no way limited to, surface imperfections, prior labels, or any other surface characteristics. The illuminator may include, but is in no way limited to one or more light emitting diodes (LEDs) including integrated or separate projection optics, one or more lasers, or cavity resonant light emitting diodes. The projection optics may include diffractive optic elements that homogenize the light emitted by the illuminator (310).

Choice of characteristics such as wavelength of the light being emitted by the illuminator (310) is dependent upon the surface being illuminated, the surface features being imaged, and the response of the photodetector array (325; FIG. 2B). The emitted light may be visible, infrared, ultraviolet, narrow band, or broadband. A shorter wavelength might be used for exciting a phosphorescing or fluorescing emission from a surface thereby enhancing the sensing of surface texture changes. The wavelength may also be selectively chosen if the surface exhibits significant spectral dependence that can provide images having high contrast. Moreover, the light may either be collimated or non-collimated. Collimated light may be used for grazing illumination in that it provides good contrast in surface textures that derive from surface profile geometry (e.g., bumps, grooves) and surface structural elements (e.g., fibers comprising the surfaces of papers, fabrics, woods, etc.).

The lens (340) illustrated in FIG. 3A may be any optical device capable of directing and focusing the light emitted from the illuminator (310) onto an optical disc or other desirable surface (100; FIG. 1A). The lens (340) may also be implemented to focus light from all or part of an illuminated area onto the photodetector array (325; FIG. 3B).

The photodetector (320) containing a photodetector array (325; FIG. 3B) is an optical sensor that may be used to implement a surface scanning device. The photodetector (320) may also include a digital signal processor (not shown) for processing the digital signals generated by the photodetector array (325; FIG. 3B), a communication channel such as a two channel quadrature output and a two wire serial port for outputting the □X and □Y relative displacement values that are converted into two channel quadrature signals by the digital signal processor.

Figure 4:
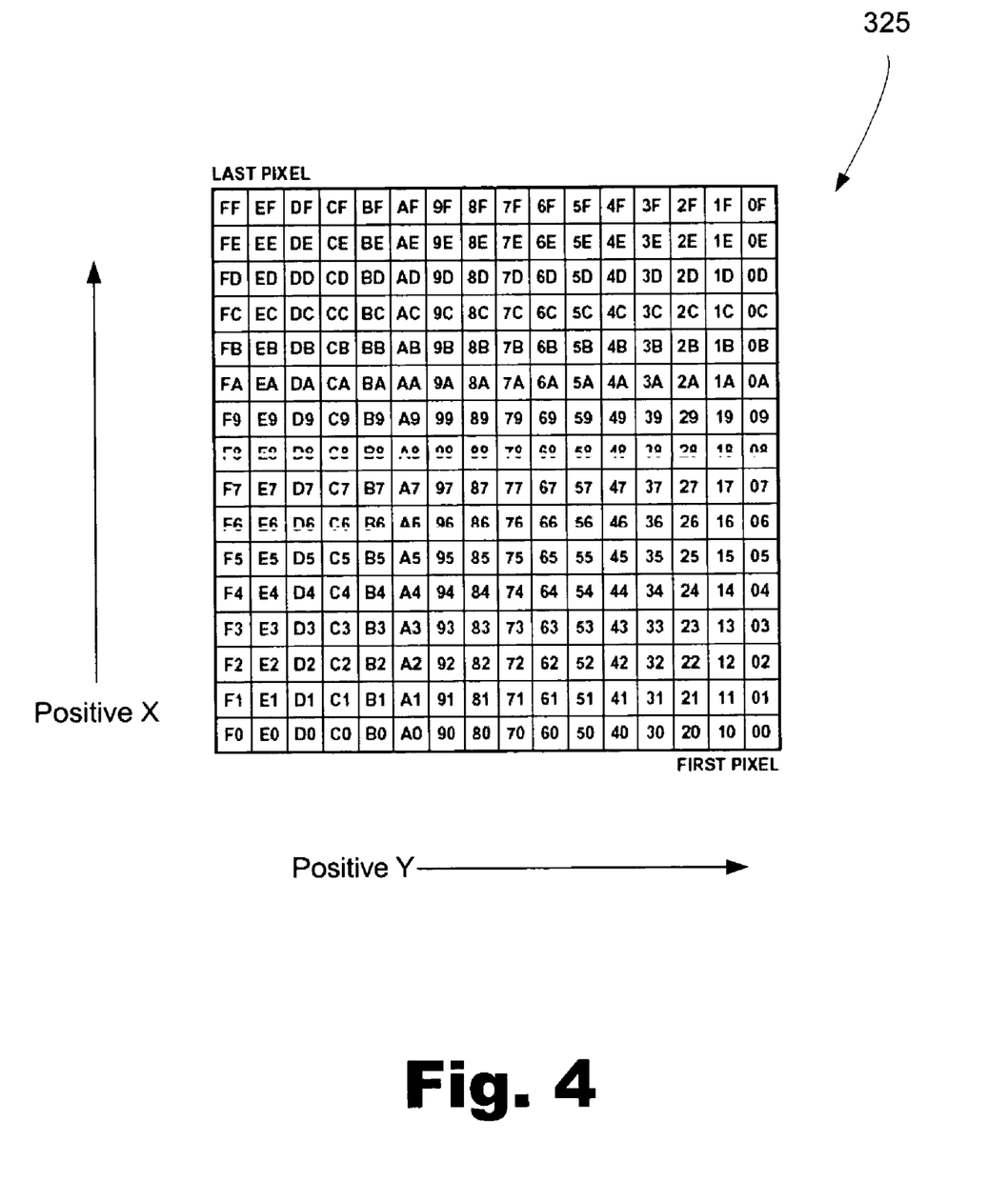
FIG. 4 illustrates a photodetector array according to one exemplary embodiment.

An exemplary photodetector array (325; FIG. 3B) disposed on the sensor (350) is illustrated in FIG. 4. As illustrated in FIG. 4, the photodetector array (325) may include a number of pixels (00-FF), of the same or varying size, that are spaced at regular intervals. The pixels (00-FF) may not be configured to discern individual features of the object being monitored; rather, each pixel may effectively measure an intensity level of a portion of an image or projection of a surface feature within its field of view. The pixels (00-FF) that make up the photodetector array (325) are configured to generate output signals indicative of the contrast variations of the imaged surface features and texture.

The pixels (00-FF) of the photodetector array (325) typically detect different intensity levels due to random size, shape, and distribution of surface features and texture as well as a randomness of the scattering of light by the surface features and texture. As the object being monitored, such as an optical disk (100; FIG. 1A), moves, different features of the object's surface will come into view of the pixels (00-FF) and the intensity levels sensed by The pixels (00-FF) will change. This chance in intensity levels may then be equated with a relative motion of the optical sensor array. Additionally, the change in intensity levels can be equated with a label or other marking on the surface of the optical disk (100; FIG. 1A). These intensity levels may then be captured and allow the OPU to selectively label the surface of the optical disk (100; FIG. 1A). While the photodetector array (325) illustrated in FIG. 3 is shown as a 16×16 array, the photodetector array may be comprised of any number of pixels.

Referring now to FIG. 3B, an assembled optical sensor array (350) that may be coupled to the OPU is illustrated. As shown in FIG. 3B, the illuminator (310) and the lens (340) are coupled to a printed circuit board (330). The lens (340) includes a top portion that extends upward through a center orifice (335; FIG. 3A) of the printed circuit board (330) while the illuminator (310) is communicatively coupled to the top portion of the printed circuit board (330). The photodetector (320) may then be disposed on top of the lens (340) and communicatively coupled to the printed circuit board (330) such that the photodetector array (325) is in optical communication with the lens (340) and any optical disc surface (100) that passes under it. The positioning clip may then be secured over the photodetector (320) and the illuminator (310). The positioning clip (300) securely couples the illuminator (310) protecting it from damage as well as positioning the illuminator (310) in optical communication with the lens (340). The positioning clip (300) also secures the photodetector (320) onto the lens (340) such that the photodetector array (325) is in optical communication with the lens (340) and with the center orifice (335) of the printed circuit board (330). According to this exemplary configuration, the assembled optical sensor (350) is then coupled to the optical device drive sled (206; FIG. 2).

Figure 5A:
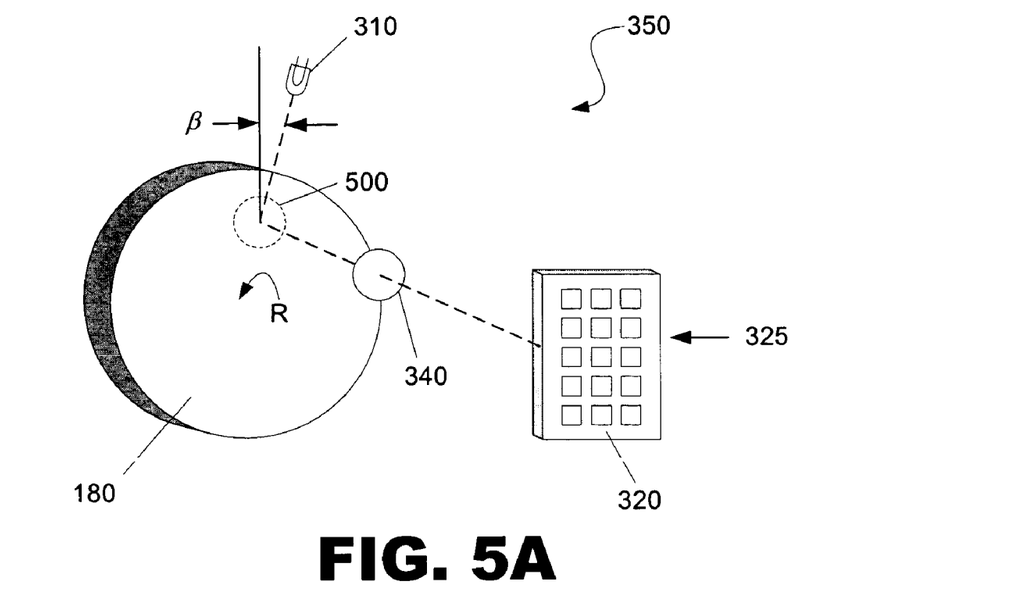
FIGS. 5A and 5B illustrate the components of an optical sensor array according to one exemplary embodiment.

FIG. 5A illustrates an exploded view of the interaction that may occur between the structural components of the present optical sensor array (350) according to one exemplary embodiment. As illustrated in FIG. 5A, when the present optical sensor array (350) is incorporated to measure the surface features or texture and the rotation R of an object (180) such as an optical disc (100, FIG. 1A), the illuminator (310) is positioned such that any light emitted by the illuminator (310) will strike the object (180) at a target area (500). The illuminator (310) is positioned relative to the object (180), such that light emitted from the illuminator (310) will strike the target area (500) at a pre-determined grazing angle □ thereby illuminating the target area (500) of the object optically coupling the photodetector (320) to the target area (500). The grazing angle □ is the complementary angle of the angle of incidence. The light grazing the object (180) is scattered by the random natural surface features of the surface texture producing a high number of domains of lightness and darkness. The domains of lightness and darkness are focused from the target area to the photodetector (320) through the lens (340). The photodetector array (325) located on the photodetector (320) may then receive and record the domains of lightness and darkness. As the object (180) is rotated R and subsequent domain information is collected, the changing domains of lightness and darkness produced by the changing surface features may be compared to determine relative motion of the object (180). As shown in FIG. 5A, the target area (500) of the present optical sensor array (350) can be much larger than the typical area that may be scanned by a laser. This allows the present optical sensor array (350) to gather marking information much more quickly than using the laser and photodetector on the OPU.

Figure 5B:
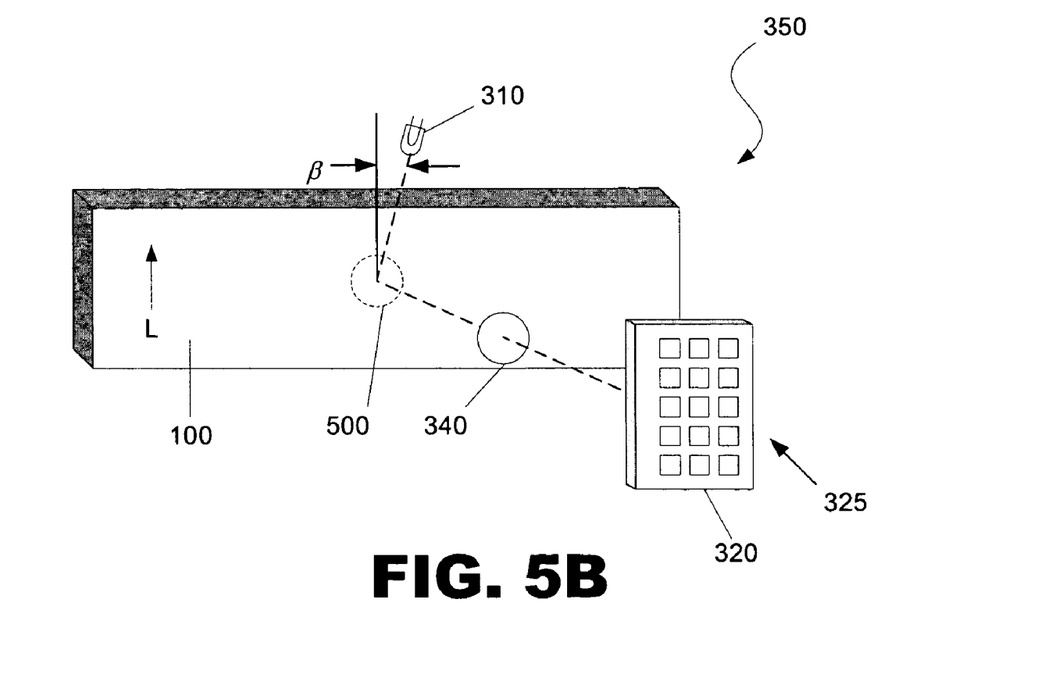

FIG. 5B illustrates the interaction between components of the present optical sensor array (350) when measuring the linear motion of an optical device sled (206, FIG. 2) in relation to an optical disc (cross-section shown) (100). As illustrated in FIG. 4B, the illuminator (310) is situated at a grazing angle □, such that the photodetector (320) may be in optical communication with a specified target area (500) of the optical disc (100). As the optical disc (100) is linearly translated in the direction L, or as the photodetector (320) moves relative to the optical disc (100), the photodetector array (325) collects data corresponding to domains of lightness and darkness illuminated by light emitted by the illuminator (310) through the lens (340). Periodic differences in the lightness and darkness of the collected domains may be used to identify relative motion between the optical disc (100) and the photodetector (320). Further details regarding optical measurement technology may be found in U.S. Pat. No. 6,246,050, which is incorporated herein by reference.

Figure 6:
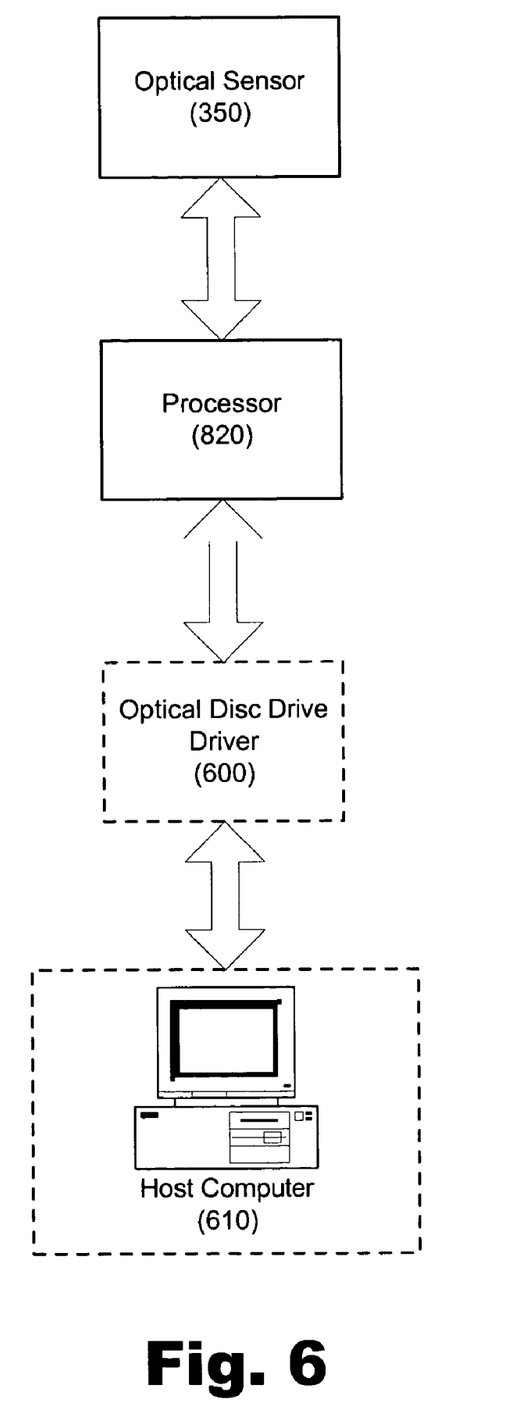
FIG. 6 is a block diagram illustrating the communication path between an optical sensor array and a host computer according to one exemplary embodiment.
Figure 8:
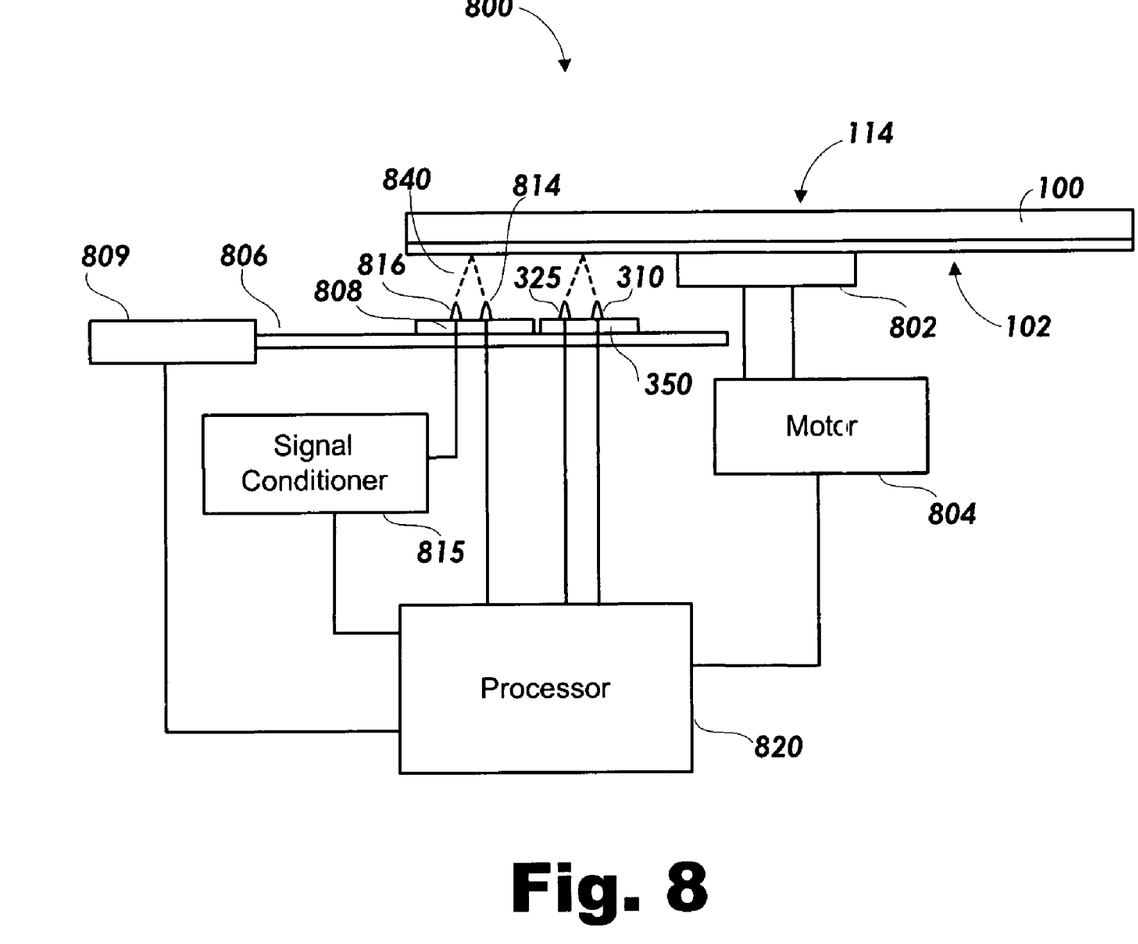
FIG. 8 is a block diagram of an optical disc with an optical sensor array mounted beneath the optical disc according to one exemplary embodiment.

FIG. 6 illustrates an exemplary line of communication between an optical sensor array (350) and a host computer (610). The optical sensor array (350) may be communicatively connected with an optical disc drive processor (820) as shown in FIG. 6. As explained above, the optical sensor array (350) sends information to the processor (820) which, in turn, controls the functions of the optical disc drive (200; FIG. 2). An optical disc drive driver (600) is associated with the processor (820) and acts as an interface between the host computer (610) and the processor (820). A user may control the optical disc drive (200) and each of the drive's functions by programming the optical disc drive driver (600). For example, the user may want the optical disc drive sled (808; FIG. 8) to be positioned at the outer edge of the optical disc (100; FIG. 8) before starting an operation. Additionally, the user may want the optical disc drive (200; FIG. 2) to decrease the rotational speed of the disc (100; FIG. 8) if previously printed disc information is found on the disk surface (102; FIG. 8). Any of these functions may be controllably changed by editing the optical disc drive driver (600).

Figure 7:
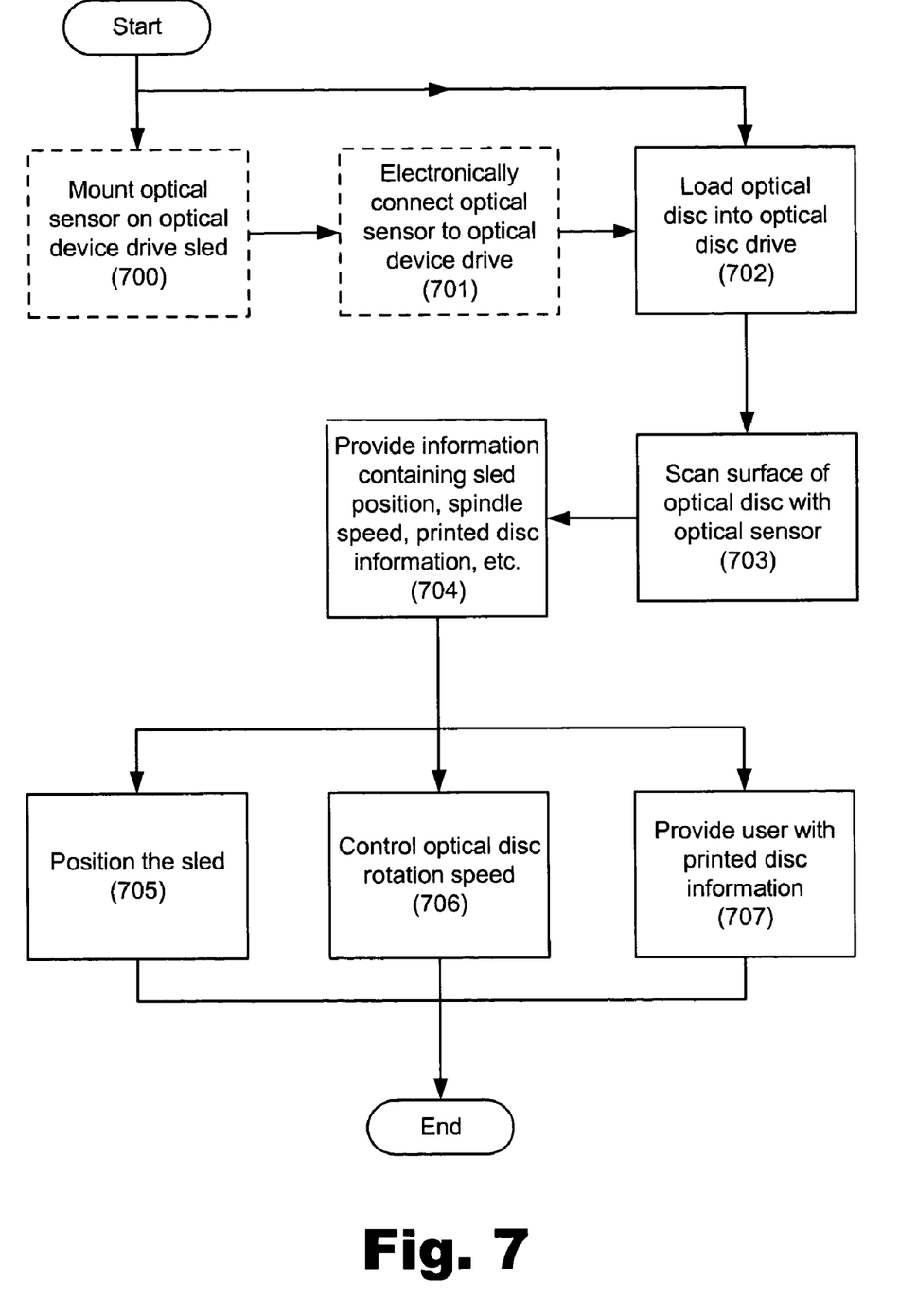
FIG. 7 is a flow chart illustrating the process of controlling an optical disc drive according to one exemplary embodiment.

FIG. 7 illustrates a flowchart demonstrating how an optical sensor array (350, FIG. 3A) can be used to provide information for controlling the optical disc drive (200, FIG. 2). First, the optical sensor array (350; FIG. 3A) is physically mounted on the OPU drive sled (step 700) and electronically coupled to the OPU drive (step 701). It will be understood that steps 700 and 701 may be omitted if the optical sensor array (350; FIG. 8) has already been installed in and electronically coupled to the optical disc drive (200; FIG. 2). Once the optical sensor array has been installed, the user may load the optical disk (100; FIG. 1A) into the optical disk drive (step 702). Once loaded, the optical sensor array (350; FIG. 3A) may scan the surface of the optical disk (step 703). As the optical sensor scans the surface of the optical disk (100; FIG. 1A), the optical sensor array (350; FIG. 3A) collects information regarding the sled position, spindle speed, printed disk information, etc. This information is then communicated to the computing device (step 704). The computing device may then use the above-mentioned information to position the sled (step 705), control the optical disk rotational speed (step 706), and/or provide the user with printed disk information (step 707). Steps 705, 706, and 707 may be performed sequentially (in any order) or simultaneously and any one of the three steps may be performed without performing the other steps.

For purposes of example and discussion only, FIG. 8 illustrates an optical disc drive assembly (800) that may be used to perform the method illustrated in FIG. 7. The optical disc drive assembly (800) illustrated in FIG. 8 includes a spindle (802) and a motor (804) for holding and spinning the optical disc (100). The label side (102) of the disc (100) is shown facing the spindle (802) such that a label may be written to the disc (100). It will be understood, of course, that data may also be written to the data side (114) of the optical disc (100) if the disc is turned over.

Positioned to face a portion of the label side (102) of the optical disc (100) is a track (806) providing for movement of a sled (808) radially with respect to the optical disc (100). Movement of the sled (808) is actuated by a solenoid (809) or other device. A focused energy emitting device, which in the present embodiment includes a laser (814), is disposed on the sled (808). The laser (814) may be used to read and/or write to the optical disc (100) by emitting a beam (840) that is reflected and read by a photodetector (816) that is also positioned on the sled (808). The laser (814) is used when reading data from the data side (114) of the optical disc (or, in some cases, when reading some data from the label side (102)). Signals received by the detector may be conditioned by a signal conditioner (815) when the system (800) is in a reading mode.

Alternatively, the system (800) may be in a writing mode as shown in FIG. 8 and as the optical disc (100) spins, a label may be written on the label side (102) by applying a photonic beam (840) from the laser (814) or other photonic emitter at selective locations. The system is controlled by a processor (820). The processor may include, but is in no way limited to, a microprocessor, a microcontroller, a digital signal processor, etc. The processor (820) controls the firing of the laser (814) or other photonic emitter, the speed of the motor (804) (and thus the rotational speed of the optical disc (100)), and the position of the sled (808). Additionally, the processor (820) controls the optical sensor array assembly (350). The optical sensor array assembly (350), as explained above, includes a light source (310), which is an LED in the present embodiment, and photodetector array (325). The optical sensor array assembly (350) is communicatively connected to the processor (820), thus enabling the optical sensor array (350) to send information to the processor (820).

As shown in FIG. 8, the optical sensor array (350) may be coupled to the optical disc drive sled (808) underneath the optical disc (100). Alternatively, the optical sensor array (350) may be affixed to a separate sled (808) held in place by guide rails (208; FIG. 2) above or below the optical disc (100). The optical sensor array (350) may be coupled to the optical disk drive sled (808) with screws, clips, adhesive, or any other type of fastener. In one embodiment, the optical sensor array (350) is also electrically coupled to the optical disc drive (step 701; FIG. 7). Two-way communication is thus enabled between the optical sensor array (350) and the optical disc drive. Once an optical disc (100) is loaded in the system (800), the optical sensor array (350) may begin providing information for controlling the present system.

When the optical disk (100) is placed on the spindle (802), either the data surface (114) or the non-data surface (102) of the optical disc (100) may be scanned (step 703; FIG. 7). The surface of the disk that is scanned depends on the number and location of optical sensor arrays (350) used as well as whether the disc is inserted data side (114) up or label side (102) up. As the disc (100) is scanned, information is collected and sent from the optical sensor array (350) to the optical disc drive processor (820). The optical sensor array (350) is capable of providing information regarding the sled (808) position, spindle (802) speed (rotational speed), and printed disc information which refers to how much (if any) of the non-data, label side (102) has been written to. This information will be collected by the optical sensor array (350) scanning surface textures as explained above. The information may then be used to control one or more optical disc drive functions. For example, based on the information received, the sled (808) may be moved up or down the track (806), the rotational speed of the spindle (802) may be increased or decreased, or the labeling or data on the optical disc (100) may be appended to.

In one embodiment where the optical sensor array (350) is mounted on the sled (808) of the optical disc drive, a sled (808) will have a "home" position from which the sled (808) can determine its position on the guide rail (208, FIG. 2). When the system (800) is powered on, the sled (808) orients itself to the "home" position and advances along the track (806) to the position dictated by the optical disc drive driver (600, FIG. 6). The optical sensor array (350) may send coordinates to the processor (820) indicating how far the sled (808) has moved in either or both the X and Y directions and thus the current position of the sled (step 705; FIG. 7) may be rapidly determined. Such information may be updated thousands of times per second or more depending on the type of optical sensor (350) used. The optical sensor (350) is potentially capable of detecting very small movements due to the frequent updates.

Moreover, it is often desirable to know and control the rotational speed of the disc (100) as it spins on the spindle (802). The processor (820) may determine the rotational speed of the disk (100) from the frequently updated coordinates provided by the optical sensor (350). Based on the rotational speed, the driver of the optical disc drive (800) can then step the spindle motor up or down to the desired rotational speed (step 706; FIG. 7).

Additionally, some applications may require a scan of the non-data side (114) of an optical disc (100) to determine if anything has been printed thereon, and if so, which parts of the disc contain printed disc information. As mentioned previously, printed disc information may include any type of labeling such as a decorative design, text identifying the data stored on the disc, or data of any type stored on or affixed to the optical disc (100). In some embodiments, a label or data may be appended to the existing printed disc information, if present. As the optical sensor array (350) moves along the track (806) the images taken by the optical sensor array (350) may be sent to the processor (820) for processing to determine where labeling or data begins and ends (step 707; FIG. 7). This information may be used to determine where the label or data may be appended or it may indicate to the user that nothing has been printed on that side of the disc (100).

Figure 9:
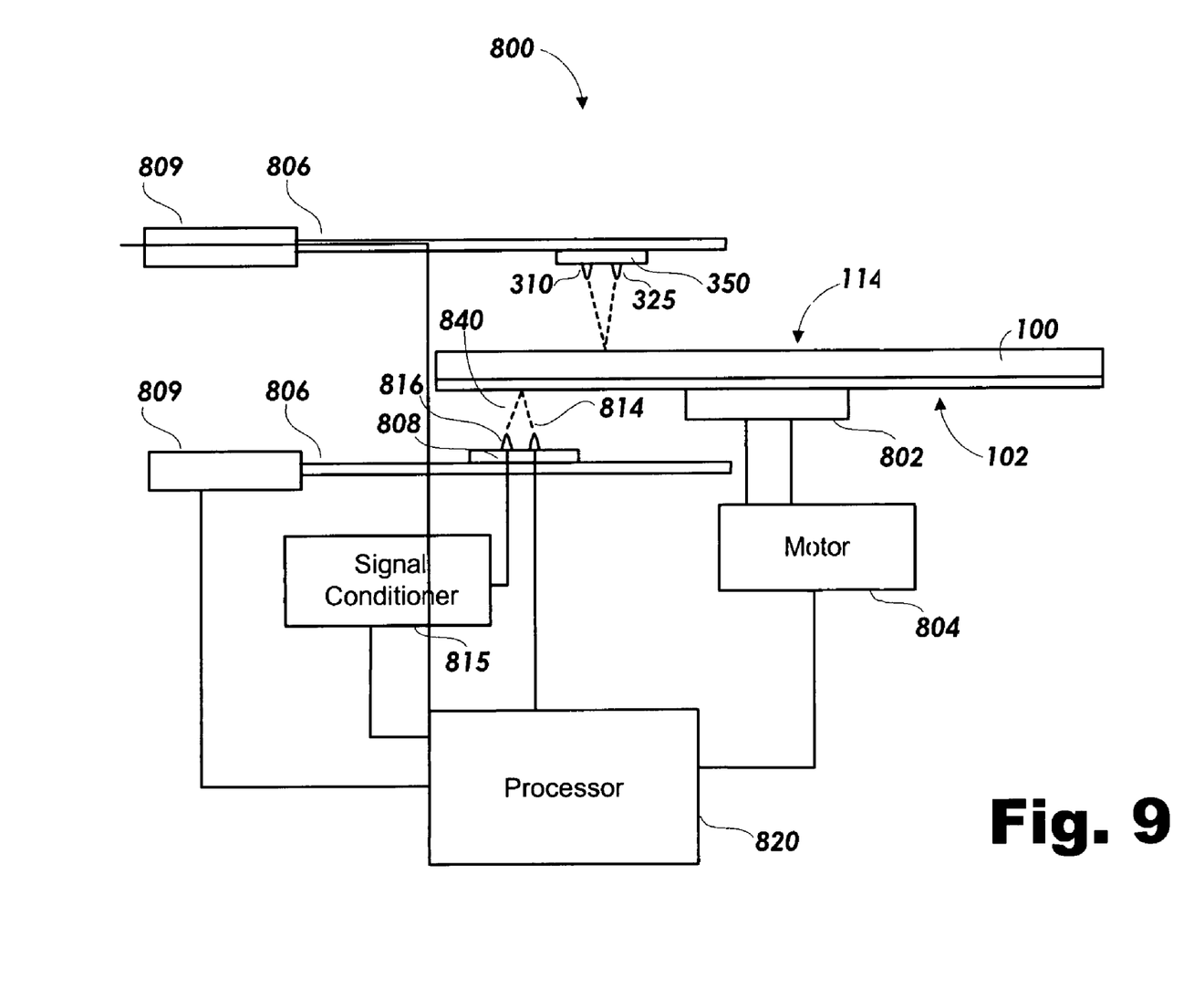
FIG. 9 is a block diagram of an optical disc with an optical sensor array mounted above the optical disc according to one exemplary embodiment.

As shown in FIG. 9, an optical sensor array assembly (350) may additionally or alternatively be positioned over the optical disc (100). Thus, the optical disc (100) can be tracked and/or scanned from above while the laser (814) and photodetector (816) mounted on the sled (808) remain and function below the optical disc (100).

Figure 10:
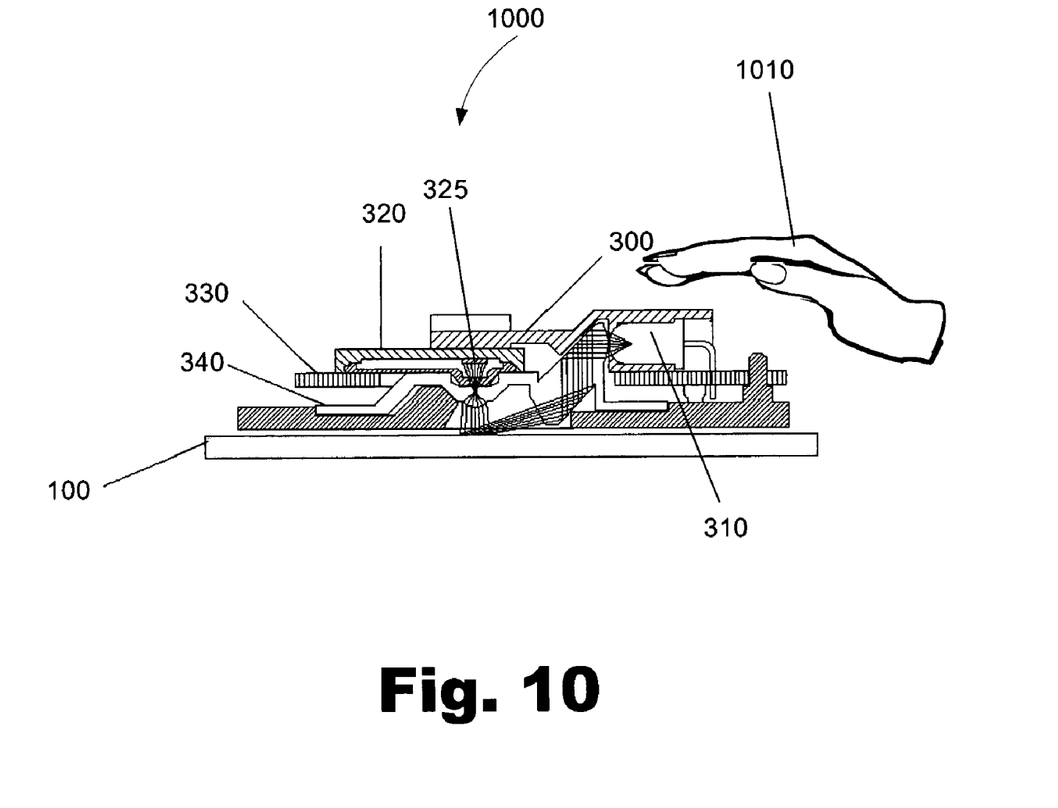
FIG. 10 is an assembled view of a manually controlled labeling device including an optical sensor array according to one exemplary embodiment.

FIG. 10 illustrates an assembled view of a manually controlled labeling device (1000) including an optical sensor array assembly (350) according to one exemplary embodiment. As shown in FIG. 10, the manually controlled labeling device (1000) includes all of the above-mentioned components of a photosensor array assembly (350; FIG. 3). Additionally, the photosensor array assembly (350; FIG. 3) may be coupled to a photonic emitter. According to this exemplary embodiment, a user may translate the labeling device (1000) across a surface of an imageable medium (100) by hand (1010) or by any other device. The photosensor array may then analyze the texture of the imageable medium's surface to track the movement of the labeling device (1000), to analyze the surface characteristics of the imageable medium (100), or to control the labeling of the imageable medium (100).

In conclusion, the present system and method provides for the use of an optical sensor array to control the function of a labeling device. By scanning the surface texture of imageable media, the present system may analyze and control the position of system components, evaluate relative velocities of both imageable media and system components, and enhance the labeling of imageable media by the labeling device. This ability to evaluate and control velocities and positions increases the resolution of the labeling device due to dead reckoning of the surface and eliminated the need for additional components such as motor speed controls.

The preceding description has been presented only to illustrate and describe embodiments of the present system and method. It is not intended to be exhaustive or to limit the present system and method to any precise form disclosed. Many modifications and variations are possible in light of the above teaching. It is intended that the scope of the present system and method be defined by the following claims.

What is claimed is:

1. A mass storage device comprising:
   a rotatable member configured to receive an optical disk;
   an optical sensor array configured to optically detect texture variations on a surface of said optical disk;
   an optical pickup unit (OPU); and
   a processor communicatively coupled to said optical sensor array and said OPU, wherein said processor is configured to selectively control said OPU in response to said texture variations detected by said optical sensor array.

2. The mass storage device of claim 1, wherein said OPU comprises
   a photonic emitter;
   a photonic emitter driver;
   a lens; and
   a photodetector.

3. The mass storage device of claim 2, wherein said optical sensor array comprises:
   a light source;
   a lens; and
   a photosensor array.

4. The mass storage device of claim 3, wherein said texture variations detected by said optical sensor array facilitate labeling a surface of said optical disk.

5. The mass storage device of claim 4, wherein said texture variations detected by said optical sensor array comprise previously printed surface label data.

6. The mass storage device of claim 3, wherein said texture variations detected by said optical sensor array facilitate a regulation of a rotational speed of said optical disk.

7. The mass storage device of claim 6, wherein said texture variations detected by said optical sensor comprises a rotational velocity of said optical disk.

8. The mass storage device of claim 3, wherein said texture variations detected by said optical sensor are used to indicate a position of said rotatable member.

9. The mass storage device of claim 3, further comprising an optical disk driver.

10. A mass storage device comprising:
    a rotatable means for rotating an optical disk;
    sensing means for optically detecting texture variations on a surface of said optical disk;
    an optical pickup unit (OPU); and
    processing means communicatively coupled to said sensing means and said OPU, wherein said processing means is configured to selectively control said OPU in response to texture variations detected by said sensing means.

11. The mass storage device of claim 10, wherein said OPU comprises
    a laser;
    a laser driver;
    a lens; and
    a photodetector.

12. The mass storage device of claim 11, wherein said sensing means comprises an optical sensor array.

13. The mass storage device of claim 12, wherein said optical sensor array comprises:
    a lighting means;
    a focusing means for focusing a light from said lighting means onto said optical disk; and
    a photosensor array.

14. The mass storage device of claim 13, wherein said photosensor array is configured to detect texture variations on a surface of said optical disk.

* * * * *

UNITED STATES PATENT AND TRADEMARK OFFICE
CERTIFICATE OF CORRECTION

PATENT NO. : 7,483,184 B2  Page 1 of 1
APPLICATION NO. : 10/683021
DATED : January 27, 2009
INVENTOR(S) : Andrew Koll et al.

It is certified that error appears in the above-identified patent and that said Letters Patent is hereby corrected as shown below:

On the face page, in field (75), in "Inventors", in column 1, line 2, delete "Andy" and insert -- Andrew L. --, therefor.

Signed and Sealed this

Eighteenth Day of August, 2009

David J. Kappos
*Director of the United States Patent and Trademark Office*